United States Patent
Keller et al.

(10) Patent No.: US 8,560,694 B2
(45) Date of Patent: Oct. 15, 2013

(54) VIRTUAL APPLICATION SERVER WITH VERSION CONTROL

(75) Inventors: Bryan Keller, Snoqualmie, WA (US); Kenneth W. Revels, Woodinville, WA (US); Alan C. Shi, Redmond, WA (US); Daniel Drew, Aliso Viejo, CA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/024,110

(22) Filed: Feb. 1, 2008

(65) Prior Publication Data

US 2009/0198769 A1 Aug. 6, 2009

(51) Int. Cl.
*G06F 15/173* (2006.01)

(52) U.S. Cl.
USPC .......................................................... 709/226

(58) Field of Classification Search
USPC ................................................. 709/224, 225
See application file for complete search history.

(56) References Cited

U.S. PATENT DOCUMENTS

| | | | |
|---|---|---|---|
| 6,421,787 B1* | 7/2002 | Slaughter et al. .................. | 714/4 |
| 7,257,541 B1* | 8/2007 | Notani ........................... | 705/348 |
| 7,801,947 B2* | 9/2010 | Yeh et al. ........................ | 709/203 |
| 7,865,582 B2* | 1/2011 | Santos et al. .................... | 709/223 |
| 2002/0065919 A1* | 5/2002 | Taylor et al. .................... | 709/226 |
| 2002/0091872 A1 | 7/2002 | Bourke-Dunphy et al. | |
| 2002/0140733 A1* | 10/2002 | Edlund et al. ................. | 345/764 |
| 2003/0159057 A1* | 8/2003 | Mangold et al. .............. | 713/193 |
| 2005/0005018 A1 | 1/2005 | Datta | |
| 2005/0210096 A1 | 9/2005 | Bishop et al. | |
| 2005/0228852 A1* | 10/2005 | Santos et al. ................... | 709/200 |
| 2005/0262173 A1 | 11/2005 | Choquier et al. | |
| 2005/0289524 A1* | 12/2005 | McGinnes ..................... | 717/140 |
| 2006/0031529 A1* | 2/2006 | Keith, Jr. ........................ | 709/227 |
| 2006/0222176 A1* | 10/2006 | Ohishi ............................ | 380/51 |
| 2006/0259949 A1 | 11/2006 | Schaefer et al. | |
| 2007/0168937 A1* | 7/2007 | Mallick ......................... | 717/106 |
| 2007/0233698 A1 | 10/2007 | Sundar et al. | |
| 2007/0234295 A1 | 10/2007 | Dufour et al. | |
| 2007/0245338 A1* | 10/2007 | Musha .......................... | 717/173 |
| 2008/0281969 A1* | 11/2008 | Horton et al. ................. | 709/227 |

OTHER PUBLICATIONS

"Thinstall 3.3 Virtualization Suite", Copyright thinstall.com, 2007, pp. 4.
"Microsoft Application Virtualization 4.5 Beta—What's New", SMS &MOM, pp. 2.
"LANDesk Application Virtualization", 2007, LANDesk Software, pp. 2.
"Citrix Presentation Server", 1999-2007 Citrix Systems, Inc., pp. 2.

* cited by examiner

*Primary Examiner* — Scott Christensen
(74) *Attorney, Agent, or Firm* — Rau Patents, LLC

(57) ABSTRACT

A management system for virtual applications may deploy sets of virtual applications to many client devices, dynamically allocate virtual application servers to individual clients, manage updates to the virtual applications, and provide other high level management to deployments of virtual applications. A client device may include a virtual application management client that may communicate with a management server. The management client may add or remove virtual applications to the client device based on a policy received from the management server, and may query the management server to determine a currently available virtual application distribution server when a virtual application is requested. The management server may distribute and manage versions of applications across one or more virtual application distribution servers.

9 Claims, 5 Drawing Sheets

200
FUNCTIONAL DIAGRAM OF
SYSTEM WITH VERSION
MANAGEMENT SYSTEM

VIRTUAL APPLICATION SERVER WITH VERSION CONTROL

BACKGROUND

Virtual applications are computer programs that may be executed in an application layer that is separate from the operating system layer. Virtual applications may enable an application to be executed on clients without being installed and to be administered from a central location.

Every application depends on its OS for a range of services, including memory allocation, device drivers, and much more. Incompatibilities between an application and its operating system can be addressed by either server virtualization or presentation virtualization. Application virtualization may address incompatibilities between two applications installed on the same instance of an operating system.

Applications installed on the same device commonly share configuration elements, yet this sharing can be problematic. For example, one application might require a specific version of a dynamic link library (DLL) to function, while another application on that system might require a different version of the same DLL. Installing both applications creates a situation where one of the applications may overwrite the version required by the other causing one of the applications to malfunction or crash. To avoid this, organizations often perform extensive compatibility testing before installing a new application, an approach that's workable but quite time-consuming and expensive.

Application virtualization may create application-specific copies of all shared resources. Each application may have a separate configuration of potentially shared resources such as registry entries, dynamic linked libraries, and other objects that may be packaged with the application. The package may be executed in a cache, creating a virtual application. When a virtual application is deployed, it uses its own copy of these shared resources.

A virtual application may be more easily deployed. Since a virtual application does not compete for dynamic linked library versions or other shared aspects of an application environment, compatibility testing may be reduced or eliminated. In many instances, some applications may be used in a virtual manner while other applications may be operated natively.

SUMMARY

A virtual application server may be able to install and serve new versions of a virtual application. In some cases, the virtual application server may be capable of installing and serving a new version while simultaneously serving an older version. The virtual applications may be downloaded by a client and executed or may be streamed from the virtual application server. A version management server may be used in an enterprise to download, install, and manage updates to groups of virtual application servers, and in some cases may be used to determine which version of a virtual application may be used for a particular request from a client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
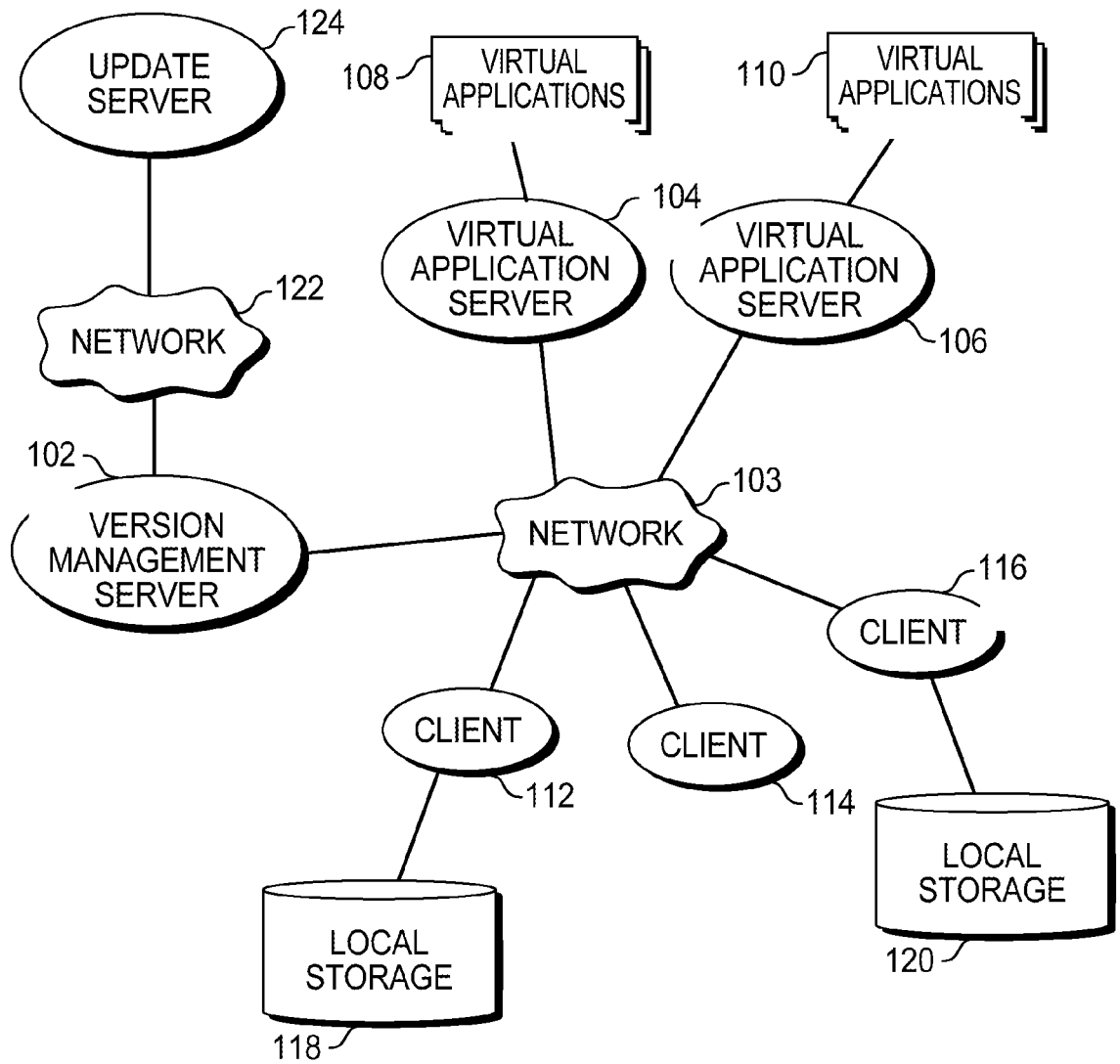
FIG. 1 is a diagram illustration of an embodiment showing a system with version management for virtual applications.

A system for deploying virtual applications may include a version management server that may provide version management across many virtual application servers. The virtual application servers may distribute virtual applications to clients using a downloading distribution or a streaming distribution.

The version management server may receive an update and may distribute the updates to various virtual application servers. The version management server may keep an inventory and status of virtual applications on the various virtual application servers. An administrative user interface may be used to select the updates to implement, determine which virtual application servers to update, and to cause the updates to be implemented.

In some embodiments, the virtual application servers may be capable of streaming multiple versions of an application. For example, one client may establish a connection with the server to obtain the current version of an application. While the first client is operating the first version of the application, an update may be distributed to the server. A second client may establish a different connection and start streaming the second version of the same application. When the first client terminates the application and restarts, the first client will be connected to the newer version.

When a request for a virtual application is generated and several versions of the virtual application are available on a virtual application server, a decision may be made to determine which of the versions are to be executed. In some embodiments, a version management server or virtual application server may determine the appropriate version. In other embodiments, a set of available versions may be transmitted to the client and the client may determine which of the available versions to execute.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with managed virtual applications. Embodiment 100 is a simplified example of a virtual application management system that may manage updates and different versions of virtual applications across multiple virtual application servers.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a simplified example of various components that may make up a virtual application deployment system that manages different versions of the virtual applications. One use scenario for the system may be to manage and deploy virtual applications across a large enterprise where many virtual application servers may deploy virtual applications to many hundreds or even thousands of client devices.

Virtual applications have several capabilities that differentiate virtual applications from conventional applications. Virtual applications may be 'packaged' with registries, dynamic linked libraries (DLLs), and other components of an application. The virtual application may be executed in a manner that does not interfere with other applications, services, or executables on a client device. Virtual applications may be executed in a virtual environment that separates the application layer from the operating system layer in a computing platform.

In a conventional or non-virtual application, many components such as registry entries, DLLs, and other components are installed within other similar components in an operating system. An example of a problem may occur when two applications share the same DLL, but one application gets upgraded and may expect one version of the DLL while the other application may operate with an older version of the same DLL.

Because conventional applications interface with operating system components, conventional applications generally undergo a complex install and uninstall process. In cases where an application has a shared component such as a shared DLL, an uninstall process may leave the DLL so as not to cause a problem with another application.

Virtual applications may generally be added and removed without a complex install or uninstall process. Virtual applications may be added or removed by adding or removing the unitized virtual application package from a client device.

Virtual applications may be supplied from a server in different forms. In one type of deployment, a virtual application may be streamed from a virtual application server. In a streaming deployment, a client may request a virtual application from a virtual application server which may begin transmitting portions of the virtual application that may be executed directly. A streaming virtual application may begin execution on the client device with a portion of the executable instructions and, in some cases, without having the entire virtual application downloaded to the client. Streaming techniques may enable a virtual application to start execution quickly. In many such deployments where there is available network bandwidth and a responsive virtual application server, a user experience may rival a locally stored and executed application.

Some streaming deployments may enable an application to be executed on a client device by transferring executable instructions from a virtual application server to random access memory (RAM) on the client device without storing the executable instructions on a persistent storage device such as a hard disk.

Other deployments may use a local copy of a virtual application that may be stored on a hard disk or other storage device local to the client. The local copy of the virtual application may be downloaded from a virtual application server prior to use.

Some embodiments may use a combination of streaming technologies with a local copy of a virtual application. Such an embodiment may use various streaming techniques to begin downloading and executing a virtual application on a client device and may further store the downloaded virtual application on a local storage device for a second or subsequent use. Many such embodiments may enable a client device to being execution quickly with the initial portions of the download and may continue to download remaining portions of the virtual application as bandwidth permits so that the client device may eventually contain the entire virtual application locally. When the application is available locally, the application may sometimes execute faster.

Streaming deployments have a capability that may enable an application to be upgraded on the virtual application server without having to upgrade or change the client device. Such a capability may ease licensing, managing, monitoring, and other administrative tasks.

Streaming deployments generally have long sessions between a client and virtual application server as the virtual application is being used. In many cases, a user may initiate a virtual application and leave the application running all through a workday, and even overnight or for several days. In some cases, virtual applications may be executing for weeks or longer.

The virtual application servers may be capable of updating the virtual application and establishing new sessions with an updated version of a virtual application while existing sessions are being served for older versions. Such capability may make it possible for a session to continue indefinitely while updates are rolled out and implemented. A client may update from one version to another, when the update is available, by merely terminating the current session and starting a new session.

The version management server 102 may be a central management point for version management for virtual application servers 104 and 106 connected to the network 103. In many embodiments, the version management server 102 may be the administrative interface for several virtual application servers. An administrator may be capable of monitoring and deploying updates across a group of virtual application servers from the version management server 102. In many embodiments, the version management server 102 may provide other administrative, monitoring, and management functions as well.

The virtual application servers 104 and 106 may each serve one or more virtual applications 108 and 110 to various clients 112, 114, and 116. In some embodiments, each virtual application server may serve multiple virtual applications to clients, while in other embodiments, each virtual application server may serve a single virtual application to clients. Each type of deployment may be used in different types of situations. For example, an enterprise may deploy virtual application servers to serve each geographic location of a multi-state or international enterprise. In a smaller location, a single virtual application server may be sufficient to serve the clients at the location, while in a very large location, large groups of virtual application servers may be used to serve all of the local clients. In the larger setting, different virtual application servers may be configured to serve a single virtual application to many clients and other virtual application servers may be configured to serve multiple virtual applications.

In a deployment within an enterprise, the network 103 may be an internal network to the enterprise. Such a network may be isolated from the Internet through various gateways or firewalls and may have characteristics of a local area network (LAN) and wide area network (WAN). In some deployments, the network 103 may include the Internet as well as portions of a local area network.

Some embodiments may use a mixture of streaming and downloaded deployments of virtual applications to clients. Clients that are connected to a local area network with high bandwidth may be configured to use streaming virtual applications. An example of such a client may be a desktop computer connected to a high speed local area network. Clients that are portable, such as laptop computers or personal digital assistants, or a desktop computer with a limited bandwidth connection may use a downloaded deployment of a virtual application.

In a downloaded deployment, a local storage 118 and 120 may be used with the clients 112 and 116, respectively, to store a virtual application from a virtual application server. The locally stored virtual application may be executed when it is the up to date version or when the client has a bad or no connection to a virtual application server.

In a downloaded deployment, the initial use of a virtual application may be downloaded in stages. A first portion of the virtual application may be downloaded so that the virtual application may begin execution with at least a portion of the entire functionality. The initial portion may be enough so that a user may begin execution, and then subsequent portions may be downloaded and executed on demand. The demand may occur when a user selects a function to execute and, if the function is not downloaded, that portion of the virtual application may be immediately downloaded. In some embodiments, portions that have not been requested may be downloaded and stored using a slower, background process so that the entire virtual application may be stored locally. Such a deployment is an example of a type of downloaded and locally run deployment of a virtual application. Different embodiments may also be used.

When a downloaded deployment is used, an updated version of the virtual application may be downloaded and merged with the locally stored version. Several updating technologies may be used for such updates, including Remote Differential Compression, Binary Delta Compression, and other technologies.

The version management server 102 may connect through a network 122 to an update server 124. The update server 124 may be a distribution point through which updates to the virtual applications may be distributed. In many embodiments, the update server 124 may be maintained by a software manufacturer or other company.

The update server 124 may make updates available periodically or when such updates are available. In many embodiments, the version management server 102 may be configured to poll the update server periodically, such as once a day or once a week to determine if an update is available. If an update is available, the version management server 102 may download the update. Such an embodiment may be an example of a pull-type system where the version management server 102 may initiate the communication to download an update.

In some embodiments, the update server 124 may push updates to the version management server 102 by using messaging or other technologies. In such embodiments, the update server 124 may initiate the communication to download an update.

In some embodiments, a virtual management server 102 may receive updates from a single update server 124. In other embodiments, different update servers may be used for different virtual applications, especially in cases where virtual applications are provided from several different vendors.

The network 122 may be the Internet or other network. In some embodiments, the network 103 and 122 may be the same networks, while in other cases, the network 103 may be internal to an enterprise while network 122 may be external to the enterprise.

The version management server 102 may receive an update for a virtual application and may, in some cases, automatically deploy the updates to the affected virtual application servers. In other cases, the updates may be stored at the version management server 102 and may be evaluated and tested by an administrator prior to deploying across an enterprise. In such a case, an update may be deployed when an administrator has issued a command or otherwise caused the update to be deployed.

Figure 2:
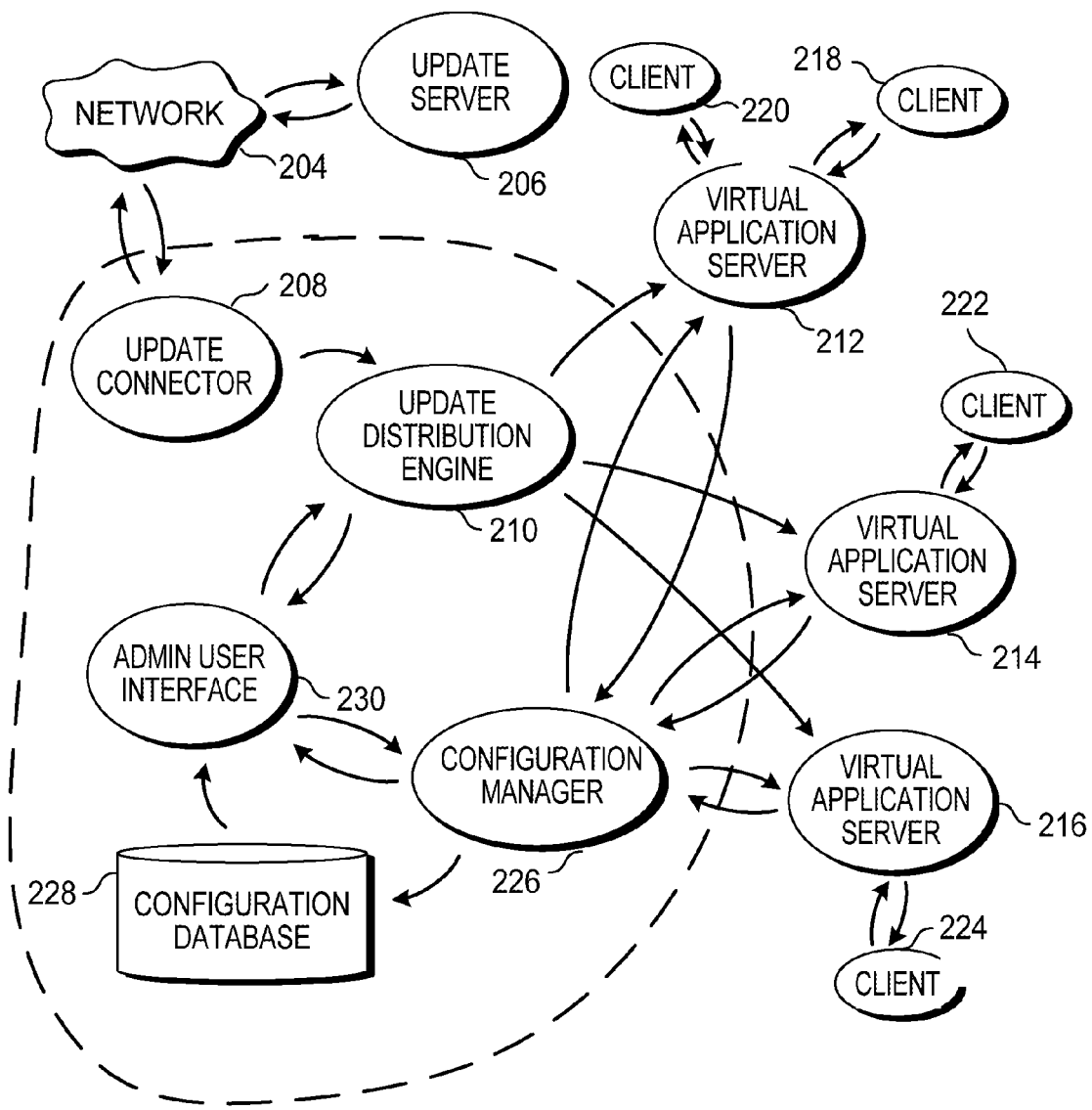
FIG. 2 is a diagram illustration of an embodiment showing functional components of a version management server for virtual applications.

FIG. 2 is a functional diagram illustration of an embodiment 200 that is an example of a version management system for virtual applications. Embodiment 200 illustrates the functional components that may make up an embodiment that manages versions and updates of virtual applications on virtual application servers.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 is an example of the functional aspects of a version management server 202 that may be used to manage updates to virtual applications. In some implementations, the version management sever 202 may be part of a management suite of functions that provide other oversight, data collection, control, or other management functions for virtual applications. In other implementations, the version management server 202 may be a standalone device or function.

The version management server 202 may connect to a network 204 and may receive updates from an update server 206. In some embodiments, the version management server 202 may have an update connector 208 that may periodically connect to and request any available updates from the update server 206. In such an embodiment, the update connector 208 may take an initial action to determine if an update is available. In some cases, the update connector 208 may send a message to the update server 206 for which a response may be received indicating that an update is available or not. In other cases, the update connector 208 may query a database, evaluate a website, or perform some other action to determine if an update is available.

In some embodiments, the update server 206 may push the update to the update connector 208 through a messaging system. In some cases, notification of an available update may be pushed to the update connector 208 and then the update connector 208 may initiate a download session.

When the update connector 208 determines that an update is available, the update connector 208 may initiate a session with the update server 206 to download an update. In some embodiments, the entire updated virtual application may be downloaded. In other embodiments, the updated portions of a virtual application may be downloaded. Various technologies such as Remote Differential Compression, Binary Delta Compression, or other updating technologies may be used for the update.

The update connector 208 may pass the update data to an update distribution engine 210 for distribution to the virtual application servers 212, 214, and 216. The updates may then be used by clients 218 and 220 connected to virtual application server 212, client 222 on virtual application server 214, and client 224 on virtual application server 216.

In some embodiments, the update distribution engine 210 may be capable of automatically transferring an update to the virtual application servers 212, 214, and 216. Some embodiments may have an administrative user interface 230 whereby an administrator may perform various management functions and may manually determine when and if an update is to be deployed to the virtual application servers.

The administrative user interface 230 may use and display data gathered by a configuration manager 226. The configuration manager 226 may collect configuration information from the various virtual application servers and store the configuration information in a configuration database 228.

The configuration information may include static information such as the virtual applications capable of being served by a virtual application server, the configuration and versions of those virtual applications, the available data storage on each virtual application servers, the number of connections supported by each virtual application server, and other information.

The configuration information may also include dynamic or current performance data for the virtual application servers, such as the number of current sessions, the processor usage, the current network bandwidth being used, and other measures of the usage of a virtual application server.

The administrator user interface 230 may be used to display the static configuration information and dynamic performance data so that an administrator may be able to monitor and survey the status of the virtual application servers.

The administrator user interface 230 may also be used to perform many administrative functions with the update distribution engine 210. For example, the administrator user interface 230 may enable an administrator to manually implement an update to some or all of the various virtual application servers. In many embodiments, the administrator may be able to test an update prior to deploying the update.

In some embodiments, the administrator user interface 230 may enable an administrator to configure rules or define logic by which an update may be deployed. For example, a rule may be defined to download and store an update, then wait for approval from an administrator prior to deploying. In some cases, deployment may be phased across different virtual application servers. Some logic may be defined to deploy updates to a subgroup of servers initially and then the remainder after an evaluation period.

Many embodiments of the administrator user interface 230 may include graphical user interfaces and various tools within a graphical user interface to display configuration data and to issue commands, create rules, and perform other input tasks. In some embodiments, a scripting or command line interface may be used to automate or simplify complex tasks.

Figure 3:
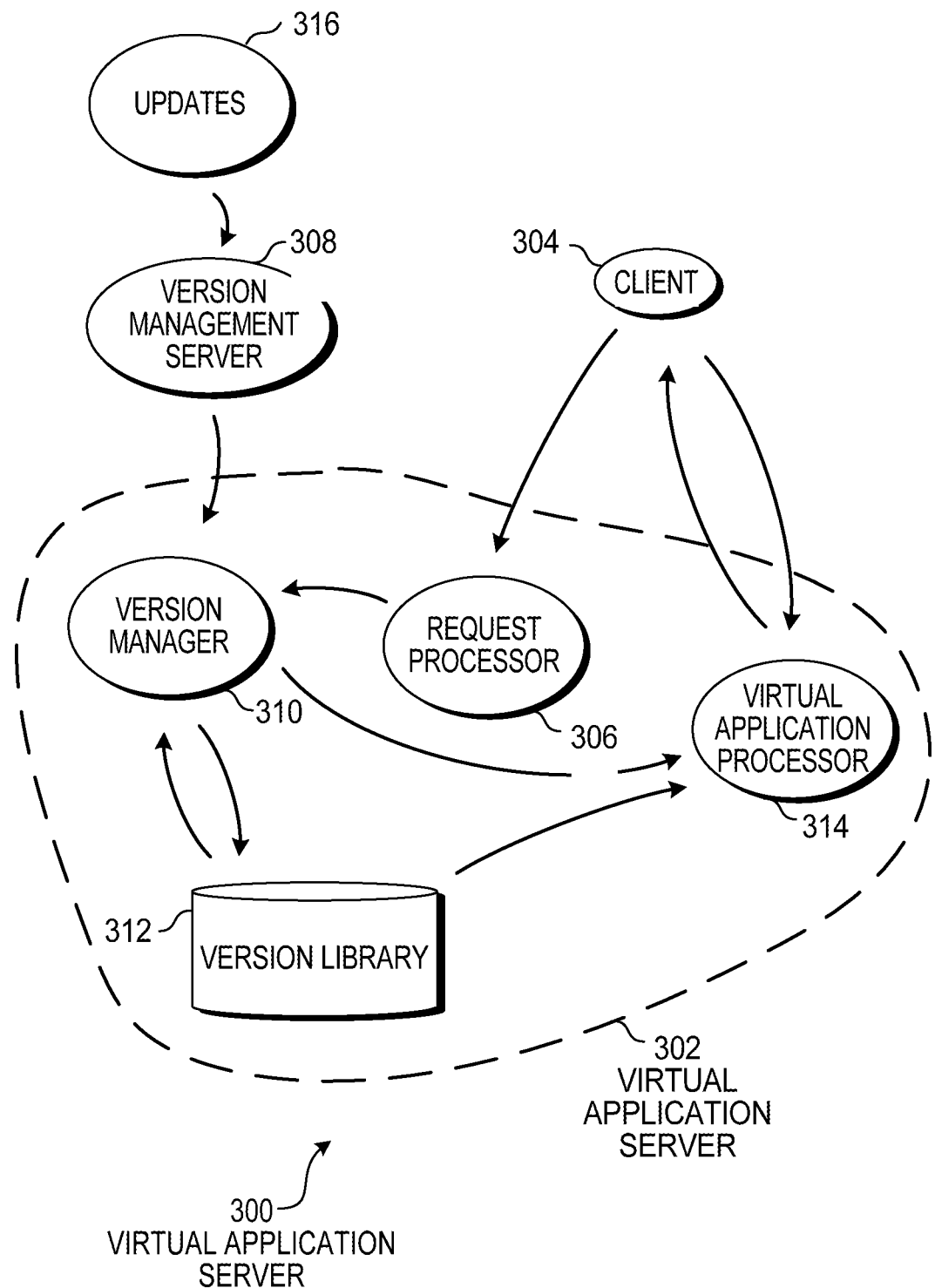
FIG. 3 is a diagram illustration of an embodiment showing functional components of a virtual application server with version management.

FIG. 3 is a functional diagram illustration of an embodiment 300 that is an example of a virtual application server. Embodiment 300 illustrates the functional components that may make up a virtual application server that may receive and implement updates to virtual applications.

The diagram of FIG. 3 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 300 illustrates the functional elements that may be present within a virtual application server 302 to handle different versions of a virtual application that is served to a client 304.

The virtual application server 302 may communicate with a version management server 308 that receives and dispenses updates 316. The version management server 308 may correspond with the version management server 202.

An update may be received by the version manager 310 from the version management server 308. In many embodiments, the version management server 308 may push updates to the virtual application server 302. In other embodiments, a pull technique may be employed by the version manager 310 to receive the updates.

When received, an update may be stored in a version library 312. The version library 312 may contain different versions of a virtual application that may be served. In some embodiments, the version manager 310 may build a complete version of a virtual application in a format so that the virtual application may be served to the client 304. In other embodiments, such a complete version may be created on the fly.

When a client 304 requests a virtual application, a request processor 306 may receive the request and transfer the request to the version manager 310. The version manager 310 may determine the latest version of the virtual application in the version library 312, and the virtual application processor 314 may serve the virtual application to the client 304.

The request processor 306 may receive an initial request for a virtual application from the client 304. In many cases, the request may be agnostic to any specific version of a virtual application. In such cases, the version manager 310 may select the latest and most up to date version to be served. In other cases, a client may request a specific version of a virtual application. Such requests may be used when evaluating different versions of a virtual application or when a specific feature in a specific version is desired, for example.

The version application processor 314 may be the function that serves a virtual application to the client 304. In some cases, a virtual application may be served in a streaming deployment, while in other cases a virtual application may be deployed in a downloaded deployment.

When a virtual application is deployed using a downloaded deployment, the virtual application processor 314 may use various technologies to download the updated portion of the virtual application. Many such technologies may enable the updated portion to be downloaded without having to download an entire copy of the virtual application. Two examples of such technologies are Remote Differential Compression and Binary Delta Compression.

When a virtual application is deployed using a streaming deployment, the virtual application processor 314 may be capable of streaming different versions of a virtual application simultaneously.

Embodiment 300 is an example of a system where a virtual application server may determine which of the available versions of a virtual application may be transmitted to the client 304. In other embodiments, some or all of the logic for selecting a version may be contained on the client 304. In such an embodiment, the virtual application server 302 may transmit some or all of the metadata concerning available versions to the client 304, and such metadata may be stored in the version library 312. The client may have logic, policies, or other mechanisms that may enable the client 304 to select a version to execute, and the client 304 may transmit a request to the virtual application server 302 that contains the desired version.

Figure 4:
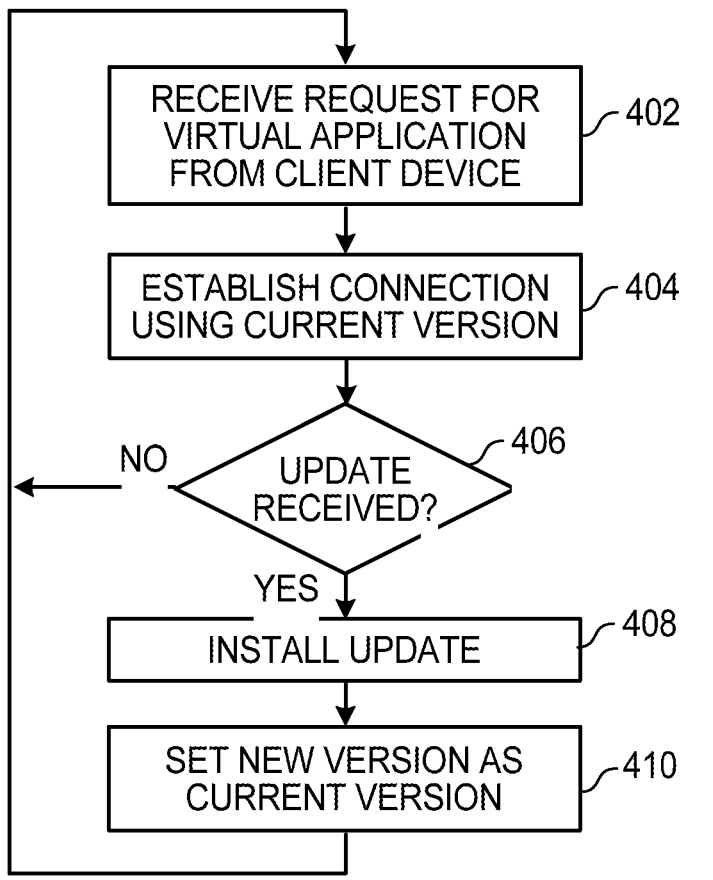
FIG. 4 is a flowchart illustration of an embodiment showing a method for serving virtual applications.

FIG. 4 is a flowchart illustration of an embodiment 400 showing a method for serving virtual applications. Embodiment 400 is an example of a sequence of functions that may be performed by a virtual application server.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 5:
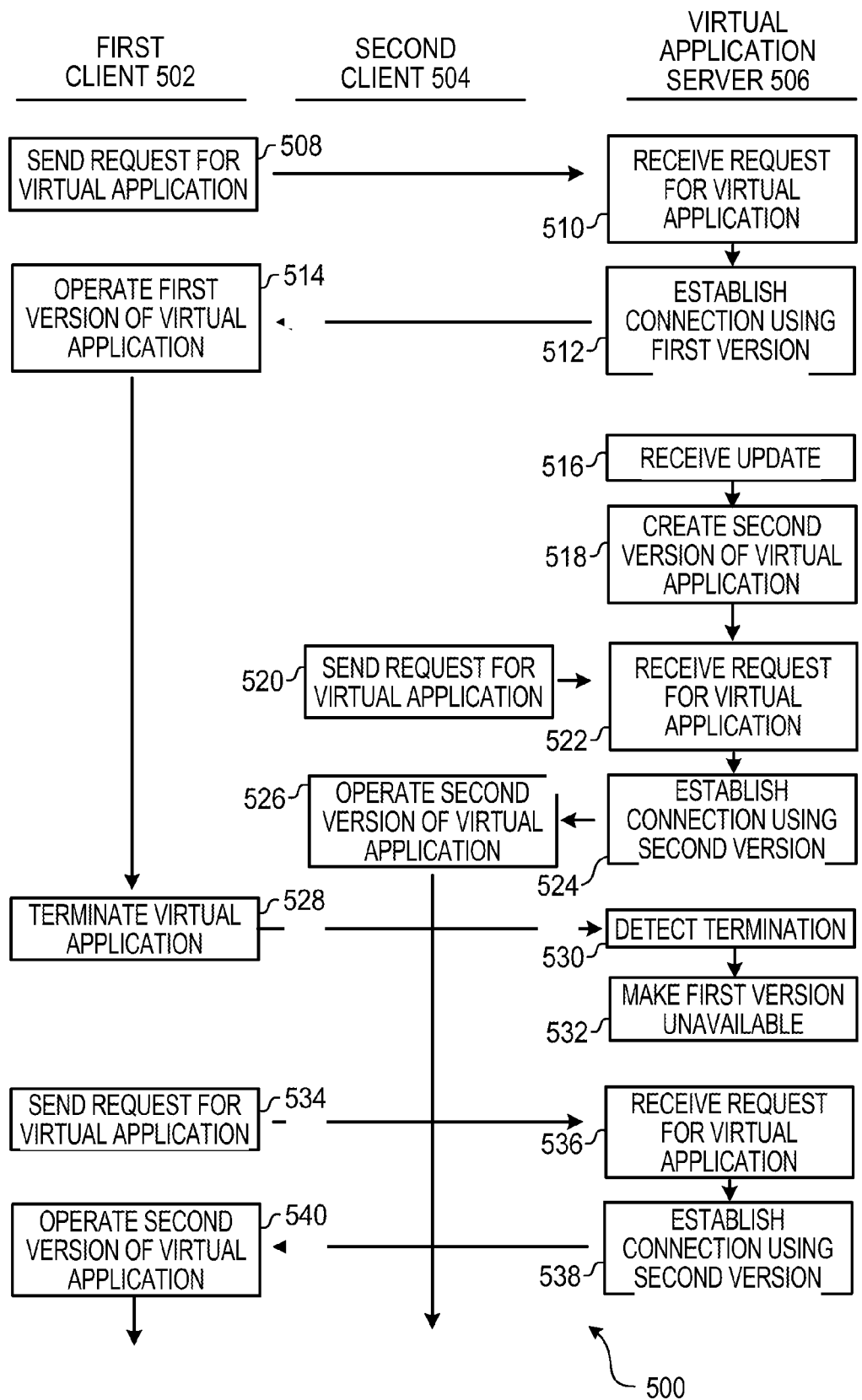
FIG. 5 is a timeline illustration of an embodiment showing the interactions between clients and a virtual application server.

Embodiment 400 is an example of a simplified sequence of steps that a virtual application server may take to respond to a request for a virtual application and any updates. A timeline representation of an implementation of such a sequence is illustrated in FIG. 5.

A request may be received for a virtual application from a client device in block 402. The client device may transmit a request through any messaging or communication mechanism. In some cases, a client device may transmit a request to a managing server that may forward the request to a virtual application server.

After receiving the request in block 402, a connection may be established with the client device in block 404. The connection may be a streaming or downloading session for transferring a virtual application to the client device. The connection of block 404 may be using the current version of the virtual application.

If no updates are received in block 406, another session may be started when a request is received in block 402. If an update to the virtual application is received in block 406, the update may be installed in block 408 and the new version of the virtual application may be set as the current version in block 410. The process may continue with block 402, where a new session would then use the newly updated version of the virtual application.

In other embodiments, the logic for determining which version of a virtual application is a current version may be performed by a client device. When a new version of a virtual application is available, a notification may be transmitted to the client, and the client may request the new version in a subsequent use of the virtual application. In many such embodiments, the client may receive messages, policies, or other indicators of the presence of a new version. Policies, logic, or other mechanisms may be used on the client to determine which version to request from the virtual application server.

FIG. 5 is a timeline illustration of an embodiment 500 showing a method for serving virtual applications. Embodiment 500 is an example of a sequence of interactions between a first client 502, a second client 504, and the virtual application server 506. The operations of the first client 502 are shown in the left hand column, the operations of the second client 504 are shown in the center column, and the operations of the virtual application server 506 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates the timeline of how two different versions of a virtual application may be served simultaneously and how a virtual application may be updated on the client side by merely stopping and restarting the virtual application.

In block 508, the first client 502 may send a request for a virtual application to the virtual application server 506. In some embodiments, the request may be sent directly to the virtual application server, while in other embodiments, the request may be sent to an intermediary server or some other device. The request may be received in block 510.

Based on the request, a connection between the virtual application server and first client may be established in block 512 using the current or first version of the virtual application. The first client 502 may operate the first version of the virtual application in block 514, and the session may be kept open until terminated in block 528.

In block 516, the virtual application server 506 may receive an update to the virtual application. A second version of the virtual application may be created in block 518.

After the second version is created in block 518, the second client 504 may send a request for the virtual application in block 520. The request may be received in block 522 by the virtual application server 506 and a connection may be established in block 524 using the second or newer version of the virtual application. In block 526, the second client 504 may operate the second version of the virtual application.

At the time of block 526, the first version of the virtual application may be being served to the first client 502 from block 514 while a second version of the virtual application may be being served from block 526. Both versions may be being transmitted to clients using a streaming or download session simultaneously.

In block 528, the first client 502 may terminate the virtual application and the connection between the first client 502 and the virtual application server 506 may be severed. The termination may be detected by the virtual application server 506 in block 530. Because no current connections exist that are using the first version of the virtual application, the first or older version of the virtual application may be made unavailable in block 532.

After the first version of the virtual application is made unavailable in block 532, a second request from the first client 502 for the virtual application may be sent in block 534 and received by the virtual application server 506 in block 536. The virtual application server 506 may establish a new connection in block 538 using the current or second version of the virtual application, and the virtual application may be executed in block 540 by the first client 502.

When the first client 502 accesses the virtual application using a streaming deployment, the connection may stay active for as long as the virtual application is operating. In some instances, a virtual application may be executed for hours, days, or even weeks or longer. In such cases, a virtual application may be updated several times and each version may have one or more connections with one or more clients.

When the first client 502 accesses the virtual application using a downloaded deployment, the connection may stay active for as long as the download process may take. In some embodiments, components of the virtual application may be downloaded as requested while in other embodiments, some components may be downloaded as requested while other components are downloaded in the background until the entire virtual application is downloaded.

Embodiment 500 is an example of how updates may be propagated to client devices. When a first connection is established with a virtual application server, a client device may receive the current version of the virtual application. While the connection is active, any updates may be incorporated on the virtual application server. As the application is terminated and restarted, the virtual application server may establish a connection using the updated version of the virtual application. From the user's perspective, the virtual application may be updated by merely restarting the application.

In some embodiments, a client device may contain logic, policies, or other mechanisms to determine which version of a virtual application to request. Embodiment 500 is an example of an embodiment where the virtual application server may perform such a determination.

When the client device is capable of determining which version of a virtual application to request, a version management server, a virtual application server, or some other device may transmit metadata that describe the available versions. The metadata may be used by the client device to determine which version to select. In some cases, a dialog box or other user interface mechanism may be presented to a user and the user may select which of the available versions to use.

A client device may periodically poll a version management server or other device to determine if an updated description of virtual application version is available. When an updated description is available, the client device may request metadata describing the available virtual applications. The client device may use the metadata to automatically or manually determine which version to select when starting a virtual application.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method executed by a virtual application server comprising:

receiving a first request for a first virtual application from a first client, said first request being made at a first time, said first virtual application having at least one application-specific copy of a shared resource, said at least one application-specific copy allocated only to said first virtual application;

determining that a first version of said first virtual application is a current version of said first virtual application at said first time;

establishing a first connection between said first client and said first version of said first virtual application, based on the determination that said first version is the current version of said first virtual application;

transmitting at least a portion of said first version of said first virtual application to said first client for execution on said first client using said first connection to interact with said first version of said first application;

updating said first version of said first application to a second version of said first virtual application wherein the second version of said first application is received from a version management server;

maintaining said first connection when said first virtual application is updated to said second version of said first virtual application while making said first version of said first virtual application unavailable for new connections;

receiving a second request for said first virtual application from a second client, said second request being made at a second time, said second time after said updating of said first version to said second version;

determining that a second version of said first virtual application is a current version at said second time; and establishing a second connection between said second client and said second version of said first virtual application while said first connection is operational and transmitting at least a portion of said second version of said first virtual application to said second client for execution on said second client, when the second version is determined to be the current version of said first virtual application at said second time.

2. The method of claim 1 further comprising:

receiving a third request for said first virtual application from said first client, said third request being made after said first connection has ended;

determining that said second version of said first virtual application is a current version; and establishing a third connection between said first client and said second version of said first virtual application and transmitting at least a portion of said second version of said first virtual application to said first client for execution on said first client.

3. The method of claim 1, said first connection comprising a streaming distribution of said first virtual application.

4. The method of claim 1, said first connection comprising a downloaded distribution of said first virtual application.

5. The method of claim 1 further comprising:

downloading at least a portion of said second version to said first client.

6. The method of claim 5, said determining that a first version of said first virtual application being performed by a version management server.

7. The method of claim 5, said determining that a first version of said first virtual application being performed by said first client.

8. A virtual application server comprising:

a request processor configured to receive a request for a virtual application from a first client device at a first time, and a second request for the virtual application from a second client device at a second time;

a version manager configured to determine a latest version of the virtual application at the time of the first or second request; and a version library comprising at least one version of the virtual application, the version library configured to be updated with a second version of the virtual application after the first time and before the second time; and a virtual application processor configured to serve the latest version of the virtual application to the requesting client device by:

establishing a first connection between the first client and the latest version of the virtual application, based on a determination by the version manager that the first version is the latest version of the virtual application;

transmitting at least a portion of the first version of the virtual application to the first client for execution on the first client device using the first connection to interact with the first version of the virtual application;

establishing a second connection between the second client device and the second version of the virtual application, based on a determination by the version manager that the second version is the latest version of the virtual application, while the first connection with the first version is operational;

and transmitting at least a portion of the second version of the virtual application to the second client for execution on the second client.

9. The virtual application server of claim 8, wherein the virtual application is delivered in a streaming fashion.

* * * * *